United States Patent [19]

DiSanto et al.

[11] Patent Number: 5,276,438
[45] Date of Patent: Jan. 4, 1994

[54] ELECTROPHORETIC DISPLAY PANEL WITH INTERNAL MESH BACKGROUND SCREEN

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 794,969

[22] Filed: Nov. 20, 1991

[51] Int. Cl.$^5$ .............................. G09G 3/34
[52] U.S. Cl. .................... 345/107; 340/296
[58] Field of Search ............. 340/787, 788; 359/296, 359/54; 358/59

[56] References Cited

U.S. PATENT DOCUMENTS

| | | | |
|---|---|---|---|
| 3,668,106 | 6/1972 | Ota | 359/296 |
| 3,792,308 | 2/1974 | Ota | 358/59 |
| 3,805,023 | 4/1974 | Wainer et al. | 219/464 |
| 4,655,897 | 4/1987 | DiSanto et al. | 359/296 |
| 4,732,830 | 3/1988 | DiSanto et al. | 359/54 |
| 4,742,345 | 5/1988 | DiSanto | 340/787 |
| 5,041,824 | 8/1991 | DiSanto | 340/787 |
| 5,053,763 | 10/1991 | DiSanto et al. | 340/787 |
| 5,077,157 | 12/1991 | DiSanto et al. | 359/296 |

*Primary Examiner*—Tommy Chin
*Assistant Examiner*—A. Au
*Attorney, Agent, or Firm*—Arthur L. Plevy

[57] ABSTRACT

A triode type electrophoretic display (10) includes a pair of substantially identical glass faceplates (12, 14) sealed to a pair of interstitial spacers (16a, 16b) to form a fluid-tight envelope for containing an electrophoretic fluid. An anodized black screen or mesh element (28) is sandwiched between the spacers and is opaque when viewed by the naked eye, thereby providing enhanced background coloration and contrast with pigment particles suspended in the fluid. The mesh (28) occupies an intermediate position relative to the extreme limits of travel of the particles as controlled by grid (18) and cathode (20) deposited upon one faceplate (14) on one side and the anode (26) deposited upon the other faceplate (12) on the other side. The screen (28) is porous, permits particles to pass through it, and is biased electrically to assist in moving the particles during formation of a displayed image.

44 Claims, 4 Drawing Sheets

ELECTROPHORETIC DISPLAY PANEL WITH INTERNAL MESH BACKGROUND SCREEN

DESCRIPTION

Technical Field

The present invention relates to an electrophoretic display panel apparatus and, more particularly, to triode and tetrode-type electrophoretic display panels having an internal mesh screen which enhances display operation.

Background Art

Electrophoretic displays (EPIDS) are now well known. A variety of display types and features are taught in several patents issued in the names of the inventors herein, Frank J. DiSanto and Denis A. Krusos and assigned to the assignee herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc. Two pending patent applications which may have some relevance to the present invention are application Ser. No. 07/667,630 entitled ELECTROPHORETIC DISPLAY PANEL WITH PLURAL ELECTRICALLY INDEPENDENT ANODE ELEMENTS and application Ser. No. 07/345,825 entitled DUAL ANODE FLAT PANEL ELECTROPHORETIC DISPLAY APPARATUS, each of which shall be described below.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the sign and direction of the electrostatic field and the charge on the pigment particles. The electrophoretic display apparatus taught in the foregoing U.S. Patents are "triode-type" displays having a plurality of independent, parallel, cathode row conductors or lines deposited on one surface of a glass viewing screen. A layer of insulating photoresist material deposited over the cathode lines and photoetched down to the cathode lines to yield a plurality of insulator strips positioned transverse to the cathode lines, forms the substrate for a plurality of independent, parallel column or grid conductor lines. The resultant cathode and grid lines form an X-Y matrix for addressing the display and the columns and rows are arranged respectively in the horizontal and vertical directions or vice versa.

A glass cap member forms a fluid-tight seal with the viewing window along the cap's peripheral edge for containing the fluid suspension and also acts as a substrate for an anode plate deposited on the interior flat surface of the cap. When the cap is in place, the anode surface is in spaced parallel relation to both the cathode and the grid matrix. Given a specific particulate suspension, the sign of the electrostatic charge which will attract and repel the pigment particles will be known. The cathode voltage, the anode voltage, and the grid voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid lines to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

An alternative EPID construction is disclosed in application Ser. No. 07/667,630, referred to above, which relates to an electrophoretic display in which the previously described grid of electrically independently controllable elements or lines is replaced with a monolithic or electrically continuous grid. Further, the monolithic anode is replaced with a plurality of discrete, electrically independent elements. In displays constructed in accordance with the teachings of the aforesaid application, pixel writing and erasure is accomplished by impressing a voltage gradient between a selected anode element and a selected intersecting cathode line such that at their point of intersection, the gradient is sufficient to overcome a constant barrier voltage on the monolithic grid element causing migration of pigment particles past the grid.

A further alternative EPID construction is described in application Ser. No. 07/345,825, referred to above, which relates to an electrophoretic display in which the cathode/grid matrix as is found in triode-type displays is overlayed by a plurality of independent separately addressable "local" anode lines thereby constituting a tetrode type display. The local anode lines are deposited upon and align with the grid lines and are insulated therefrom by interstitial lines of photoresist. The local anode lines are in addition to a "remote" anode, which is a layer deposited upon the anode faceplate as in triode displays. The dual anode structure aforesaid provides enhanced operation by eliminating unwanted variations in display brightness between frames, increasing the speed of the display and decreasing the anode voltage required during Write and Hold cycles, all as explained in application Ser. No. 07/345,825, which is incorporated herein by reference.

To be useful as a display, an electrophoretic display must be able to assume a blank or erased state; must be able to display character data written during a Write operation; and must be able to continually maintain or hold the written characters (and blank characters) in a Hold mode until they are erased or overwritten. These three modes of operation, i.e., Erase, Write and Hold are well documented in existing patents issued to the inventors herein and such description shall not be repeated at length herein.

One aspect of visual displays of all kinds which is a constant object of improvement is the clarity or resolution of the display. Resolution is at least partially dependent upon the size and number of the pixels which comprise the image. Resolution is also a function of the number of lines per inch associated with the display as well as the number of pixels per line. As is known in monochromatic displays, data can be displayed using two colors, i.e., a foreground color (A) and a background color (B) which may be interchangeable or reversible. That is, in a first mode of operation, color (A) is selected as foreground and color (B) serves as the background color. In a second mode of operation, color (B) is used to represent foreground data and color (A) to represent the background. As is known from the patents referred to above, for example U.S. Pat. No. 4,655,897, EPIDs are typically constructed with two glass faceplates through which pigment proximate thereto may be viewed. The image viewed at the cathode is reversed relative to that at the anode so that if the pigment color is arbitrarily assigned to the "foreground" color (a determination which is conventional and logical in nature) and the solution color is to be the "background" color, then the "normal" video written in foreground pigment color on the background solution color at the anode will appear in "reverse" video or in video negative at the cathode. That which is written in pigment at the anode, for example, characters, will appear as solution color characters in a field of pigment color at the cathode. U.S. Pat. No. 4,655,897 allows any given pixel to be written, therefore a "reverse" image i.e., solution color characters in a field of pigment, can be written at the anode (given the foregoing arbitrary definitions of "reverse" and "normal" video) by writing the field of the character in pigment and "not writing" the character in pigment thus leaving it solution colored. This assumes that the reverse image writing takes place starting with a clear screen, i.e., pure solution colored. One can thus appreciate that any video device such as those described in the foregoing patents, having the capacity to execute erase, full write and selective writing of pixels, has the capacity to be operated in a first or normal video mode wherein a foreground color is written upon a background color and a second or reverse video mode wherein a background color is written upon a foreground color. A frequently used color combination in an electrophoretic display is a yellow foreground against black/dark blue background, i.e., yellow pigment particles are suspended in a black/dark blue solution. In many instances, the solution is colored by a black/dark blue dye dissolved in a solvent. In order to achieve a sharp color contrast between the light colored pigment particles and the dark solution, a high concentration of dye is normally required. A high concentration is required due to the transparency of EPID displays (absent the dye) and to the thickness of the display. Since the dark solution fills the EPID display and surrounds the light colored pigment particles, high dye concentrations diminish display brightness and contrast. That is, even when the pigment particles are in the display position, not all dye is excluded from in between the particles or from in between the particle agglomeration and the glass faceplate through which it is viewed.

It is therefore an object of the present invention to provide an electrophoretic display with increased brightness and contrast by substantially reducing the above-described unwanted dye effect.

DISCLOSURE OF THE INVENTION

The problems and disadvantages associated with the image resolution and brightness of conventional electrophoretic displays using contrast dye in the electrophoretic fluid are overcome by the present invention which includes an electrophoretic display having a fluid-tight envelope with a portion thereof which is at least partially transparent. An electrophoretic fluid is contained within the envelope and has pigment particles suspended therein. The display has electronics for selectively positioning the particles within the envelope such that they form images which are visible to a viewer when viewed through the transparent portion. A screen or mesh is disposed within the envelope and divides an interior space in the envelope containing the fluid into a front portion proximate the transparent portion of the envelope and a back portion distal to the transparent portion. The mesh is at least partially opaque when viewed through the transparent portion of the envelope and obscures the particles from being viewed through the transparent portion when the particles are in the back portion. The screen or mesh allows the particles to pass through the pores under the control of the electronics such that the particles can be viewed or obscured depending upon their position with respect to the screen.

BEST MODE FOR CARRYING OUT THE INVENTION

Figure 1:
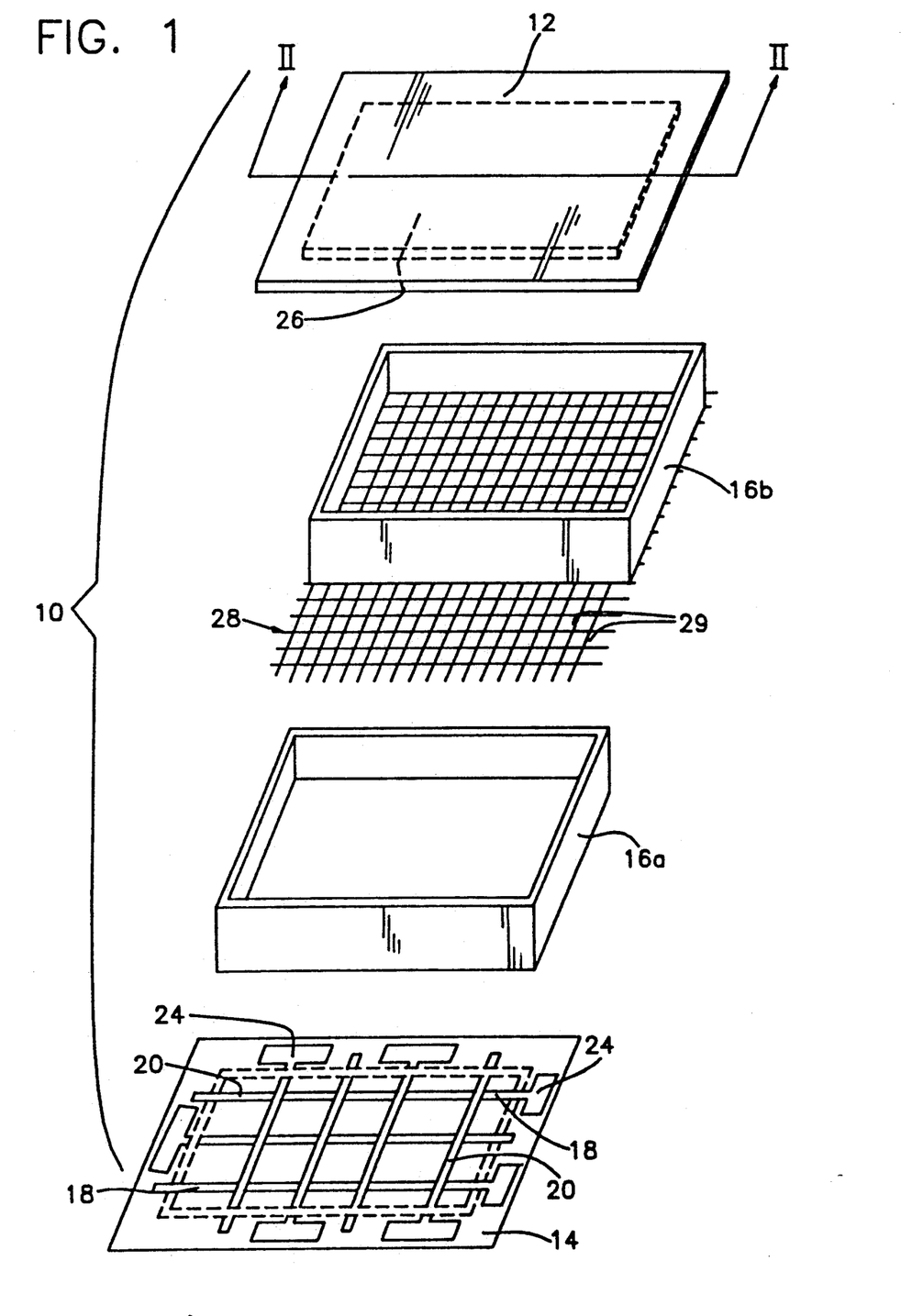
FIG. 1 is an exploded perspective view of an electrophoretic display in accordance with an exemplary embodiment of the present invention.

FIG. 1 shows an electrophoretic display 10 in accordance with the present invention. The display 10 has an anode faceplate 12 and a cathode faceplate 14 which are sealably affixed on either side of interstitial spacers 16a and 16b to form a fluid tight envelope for containing dielectric/pigment particle suspension or electrophoretic fluid (not shown). The faceplates 12 and 14 are typically flat glass plates upon which are deposited conductor elements. The techniques, materials and dimensions used to form the conductor elements upon the faceplates and the methods for making EPIDS, in general, are shown in U.S. Pat. Nos. 4,655,897, 4,732,830 and 4,742,345 which patents are incorporated herein by reference.

As depicted in FIG. 1, a plurality of independent, electrically conductive cathode elements or lines 18 (horizontal rows) are deposited upon the cathode faceplate 14 using conventional deposition and etching techniques. It is preferred that the cathode members 18 be composed of Indium Tin Oxide (ITO) as set forth in U.S. Pat. No. 4,742,345. A plurality of independent grid conductor elements or lines 20 are superposed in the vertical over the cathode lines 18 and are insulated therefrom by an interstitial photoresist layer 22 (see FIG. 2). The terms horizontal and vertical are used in regard to the orientation shown in Figure but can be interchanged. The grid lines 20 may be formed by coating the photoresist layer 22 with a metal, such as nickel, using sputtering techniques or the like, and then selectively masking and etching to yield the intersecting but insulated configuration shown in FIGS. 1 and 2. Each cathode and grid line 18, 20 terminates at one end in a contact pad 24 or is otherwise adapted to permit connection to display driver circuitry (not shown). An anode 26 is formed on an interior surface of the anode faceplate 12 by plating with a thin layer of conductor material, such as, chrome. A novel mesh element or screen 28 is sandwiched between spacers 16a and 16b to provide at least a partial barrier to the passage of light through the EPID 10. The mesh 28 has a plurality of pores 29 through which pigment particles may pass so as not to obstruct the normal operation of the EPID. Coincidental to the light barrier function, the mesh itself is an optically significant element, i.e., it is readily visible to the naked eye. In a preferred form, the mesh is constructed in a manner so that it is maximally visible, but the pores in the mesh are not visible, i.e., it is preferred that the mesh appear as a flat planar object. This is achieved by making the mesh with the minimum pore size which does not critically impede pigment movement. A screen having suitable characteristics is commercially available from the Buckee Mears Co., viz., a perforated stainless steel mesh having an approximate thickness and pore size of 10 to 12 mils. The mesh has an open area ratio, i.e., the ratio of the sum of pore area to the total surface area on one surface of the screen, of approximately 40% to 50%. The mesh is blackened by an anodizing process. The significance of the mesh screen 28 is that it provides a solid visual background for the display of pixels and it permits a reduction of dye concentration to effect a desired background intensity. For example, if the mesh were used in an EPID utilizing black/dark blue solution and yellow pigment particles, it could be colored black on at least one side so that the blackened side would function as a black background to enhance the background intensity attributable to the solution. It has been observed that the above-described mesh screen provides such an effective background that no dye is required. Even if a less effective mesh were used, the objective of increased contrast would be realized because dye concentration along with unwanted dye effects could be decreased. The screen 28 also functions to prevent inadvertent backlighting due to the overall translucence of the EPID 10. Since the screen allows for the reduction or elimination of dye, the pigment particles are more readily visible when in the display position and display brightness and contrast are increased. It should be observed that the screen 28 is positioned in the EPID 10 such that when the pigment is in the display position, it is on one side of the screen 28 and when it is in the fully written position it is on the other side of the screen 28, obscured from view by the screen 28 and/or dye in the solution.

It is preferable to fabricate the screen 28 from a conductive material enabling the screen to carry an electric charge for the purpose of aiding in controlling the movement of the pigment particles. By utilizing the screen 28 as an electrode, the effect of the screen 28 as a physical barrier is compensated for and permits it to act solely as a visual barrier.

To form an EPID 10 like that shown in FIG. 1, the parts may assembled in a stack and placed in an oven for baking. The spacers 16a and 16b, in that case, would be coated on surfaces which contact adjacent elements with a material which would become plastic at baking temperatures, such as, epoxy. Upon baking, the meltable material flows and the elements form a laminate upon cooling. Of course, other methods exist within the scope of the normally skilled artisan for assembling the elements of the EPID 10 shown, such as, e.g., gluing. The lamination of the EPID elements forms an envelope for containing the dielectric fluid/pigment particle suspension.

The cathode and grid lines 18 and 20 of the electrophoretic display 10 can assume a variety of voltages during operation for controlling the display operations of erase, hold and write. A typical panel has a large number of intersections, e.g., 2,200×1,700 or a total of 3,740,000 separately addressable o intersection points. For ease of illustration, however, only a few cathode lines 18 and grid lines 20 are depicted. Similarly, the shape and proportions of the elements depicted are for purposes of illustration only. The dimensions of the respective elements have also been greatly enlarged for illustration and are not necessarily in proportion to an actual operational device. More illustrations of electrophoretic can be seen by referring to U.S. Pat. Nos. 4,742,345 and 4,772,820, each being awarded to the inventors herein and which are incorporated by reference herein.

Certain details have been omitted from the device depicted, but are taught in prior patents. For example it has been determined that a $SiO_2$ coating on certain of the conductor elements provides beneficial results. See application Ser. No. 07/675,733. Similarly, conductor elements having a tined or forked configuration provide enhanced resolution, see U.S. Pat. No. 4,742,345 FIG. 4 and specification.

Figure 2:
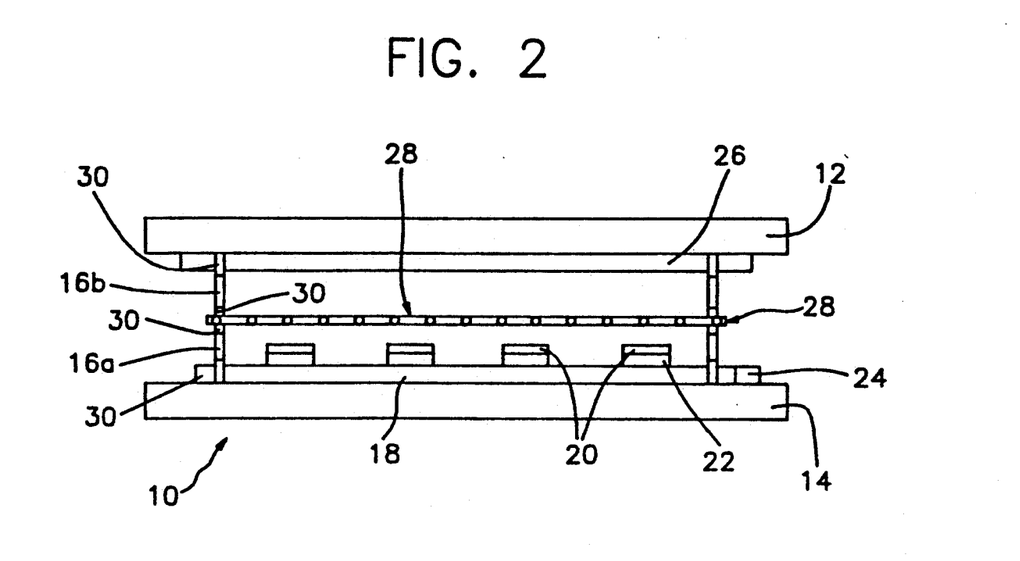
FIG. 2 is a cross-sectional view of the electrophoretic display shown in FIG. 1 in the unexploded state, taken along section line II—II and looking in the direction of the arrows.

FIG. 2 shows the electrophoretic display of FIG. 1 assembled and in cross-section. The anode 26 in the embodiment shown, is a plate-like area of conductor material having a length and width essentially matching that of the cathode/grid matrix, i.e., coextensive with the matrix, as is taught in the above referenced patents and applications of the present Applicant. The cathode elements 18, grid elements 20 and grid insulator strips 22 as are also like those shown in the foregoing patents, etc. Since all conductor elements are quite thin, they extend beneath the interstitial spacers 16a and 16b without special provision and at least one end thereof provide a terminal exterior to the envelope for connecting display driver circuitry (not shown). For the purposes of illustration, epoxy bonding material 30 is depicted providing the laminating bond between spacers 16 and the faceplates 12 and 14 and for laminating the mesh screen 28 between the spacers 16a and b.

As stated above, the mesh screen 28 is preferably formed from a conductive material and is electrically biased to overcome any physical barrier it presents to particle migration. Exemplary voltages applied to the various elements in the EPID to perform certain basic functions are set forth below.

For the following operations, typical voltages would be:
FULL WRITE:
V ANODE = +200
V MESH = +140
V GRID = 1.5 to 3.0
V CATH = −0
ERASE: p0 V ANODE = −200
V MESH = −100
V GRID = −10
V CATH = +15
HOLD:
V ANODE = +200
V MESH = +140
V GRID = −10
V CATH = +15
TO WRITE AN IMAGE:
V ANODE = +200 pulsed to +400
V MESH = +140

The image is then written in the usual manner by loading data into the grid elements and sequentially making each cathode low. AFTER WRITING ENTIRE IMAGE V MESH = 100 VAC for @2 seconds, then V MESH = +140 for viewing image with power on.
TO REMOVE POWER FROM THE DISPLAY WITHOUT DISTURBING THE IMAGE:
V ANODE = +200
V MESH = 100 vac
V GRID = −10
V CATH = +15

Power, is then removed from the anode, cathode grid and mesh in that order. The display is thus completely removed from power, but the image displayed remains undisturbed.

By writing with AC on the mesh and a positive voltage on the anode, all pigment has been removed from the front surface and only the black mesh is visible. Thus, even in a suspension which is completely devoid of dye, the black background is very black and the pigment appears much brighter, improving contrast and permitting the panel to be operated at a lower illumination.

Figure 3:
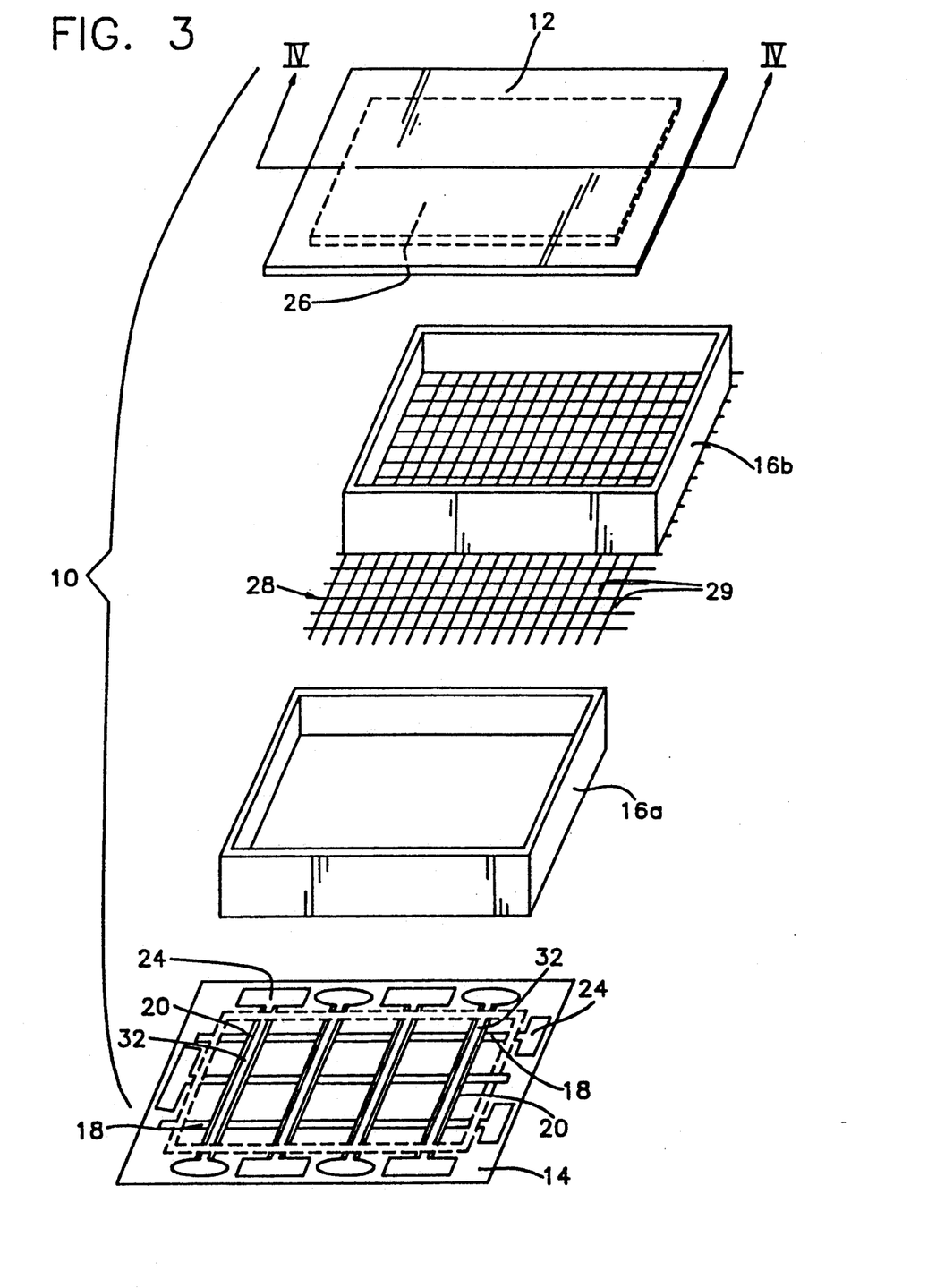
FIG. 3 is an exploded perspective view of an electrophoretic display in accordance with a second exemplary embodiment of the present invention.
Figure 4:
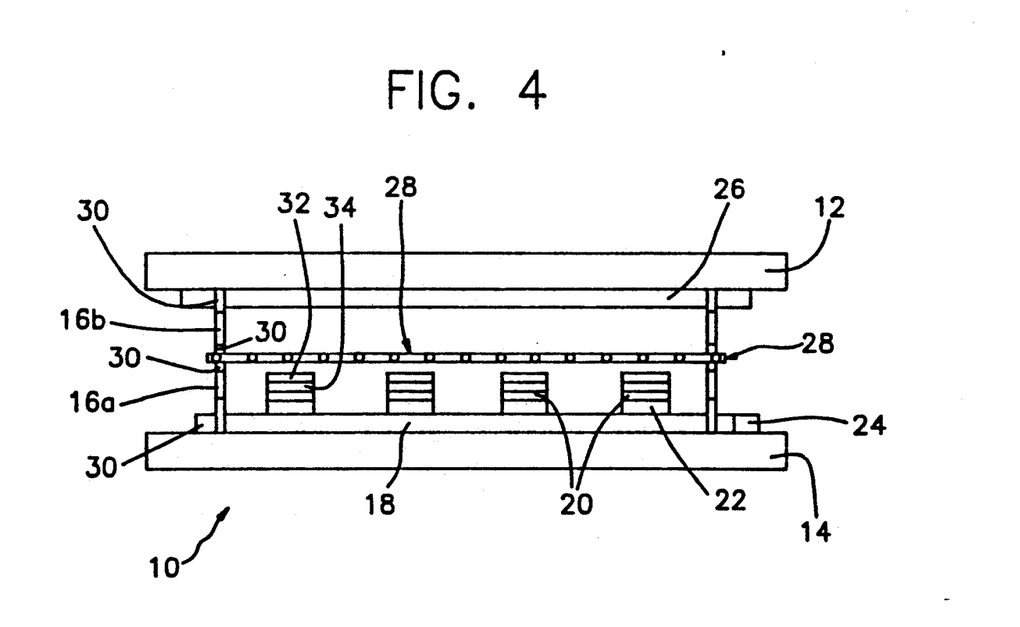
FIG. 4 is a cross-sectional view of the electrophoretic display shown in FIG. 3 in the unexploded state, taken along section line IV—IV and looking in the direction of the arrows.

FIGS. 3 and 4 illustrate the incorporation of the above-described mesh screen 28 into a tetrode-type display. As can be readily determined by comparing FIGS. 1 and 2 to FIGS. 3 and 4, many of the basic elements of the display 10 are similar or the same in both triode and tetrode-type displays. The same reference numerals identifying similar elements shared by both embodiments are employed to point out this similarity. The embodiment shown in FIGS. 3 and 4 differs from that previously described with respect to the addition of a plurality of local anode elements 32 which are deposited upon corresponding photoresist insulator strips 34 (see FIG. 4) formed upon the grid elements 20. The methods for forming the local anode elements 32 are set forth at length in application Ser. No. 07/345,825. In brief, a layer of photoresist is applied over the grid elements 20, which are formed from a first metal, such as, chrome. A layer of a second metal, e.g., nickel or aluminum, is applied over the photoresist layer. Yet another layer of photoresist is applied over the second metal layer, and is then masked, exposed and developed in the same form as the grid elements. The second metal layer is then etched with a suitable solution. The photoresist between the first and second metal layers is then plasma etched. A layer of $SiO_2$ is then deposited over the resulting structure.

As in the triode-type display, the screen 28 is preferably constructed from a conductor material and is electrically biased to assist in pigment particle position control. The following are exemplary voltages applied to the aforesaid elements to effect certain basic display operations.

For the following operations, typical voltages would be:
(ANODE = REMOTE ANODE; L.A. = LOCAL ANODE)
FULL WRITE:
V ANODE = +200
V MESH = +140
V L.A. = 0
V GRID = +1.5 to +3.0
V CATH = 0
ERASE:
V ANODE = −200
V MESH = −100
V L.A. = 0
V GRID = −10
V CATH = +15
HOLD: TO REMOTE ANODE
V ANODE = +200
V MESH = +140
V L.A. = 0
V GRID = −10
V CATH = +15
PREPARE FOR SELECTIVE IMAGE WRITING:
Connect MESH to VAC for 2 seconds
Return MESH to +140
Connect Hold to Local ANODE: REMOTE ANODE and MESH to LOCAL ANODE to +20 V
V ANODE = +20
V MESH = +20
L.A. = +20
V GRID = −10
V CATH = +15
TO WRITE IMAGE TO LOCAL ANODE:
V L.A. = +20 pulsed to +32

The image is written in the usual manner by loading data into the grid elements and sequentially making each cathode low.
HOLD IMAGE:
After writing the image, set the voltages as follows:
V ANODE = +20
V MESH = +20
V L.A. = +20
V GRID = −10
V CATH = +15
HOLD IMAGE WITHOUT POWER:
To completely remove power from the panel without losing the image, proceed as follows:
V ANODE = +200
V MESH = 100 VAC
V L.A. = +20
V GRID = −10
V CATH = +15
V MESH = Return to +0 to −V1
V MESH = Return to −V1

REMOVE VOLTAGE FROM ANODE LOCAL ANODE, CATHODE GRID AND MESH

By connecting the mesh to AC in the HOLD state and pulsing the positive anode, all excess goes through the mesh holes to the anode and after writing to the local anode, in the areas where pigment has been removed from the front surface, only the black mesh screen is visible. Thus, the suspension does not contain dye and the pigment brightness is greatly enhanced. Since the black is very dark and the pigment is brighter, the contrast is better and the panel may be viewed at lower illumination.

Figure 5:
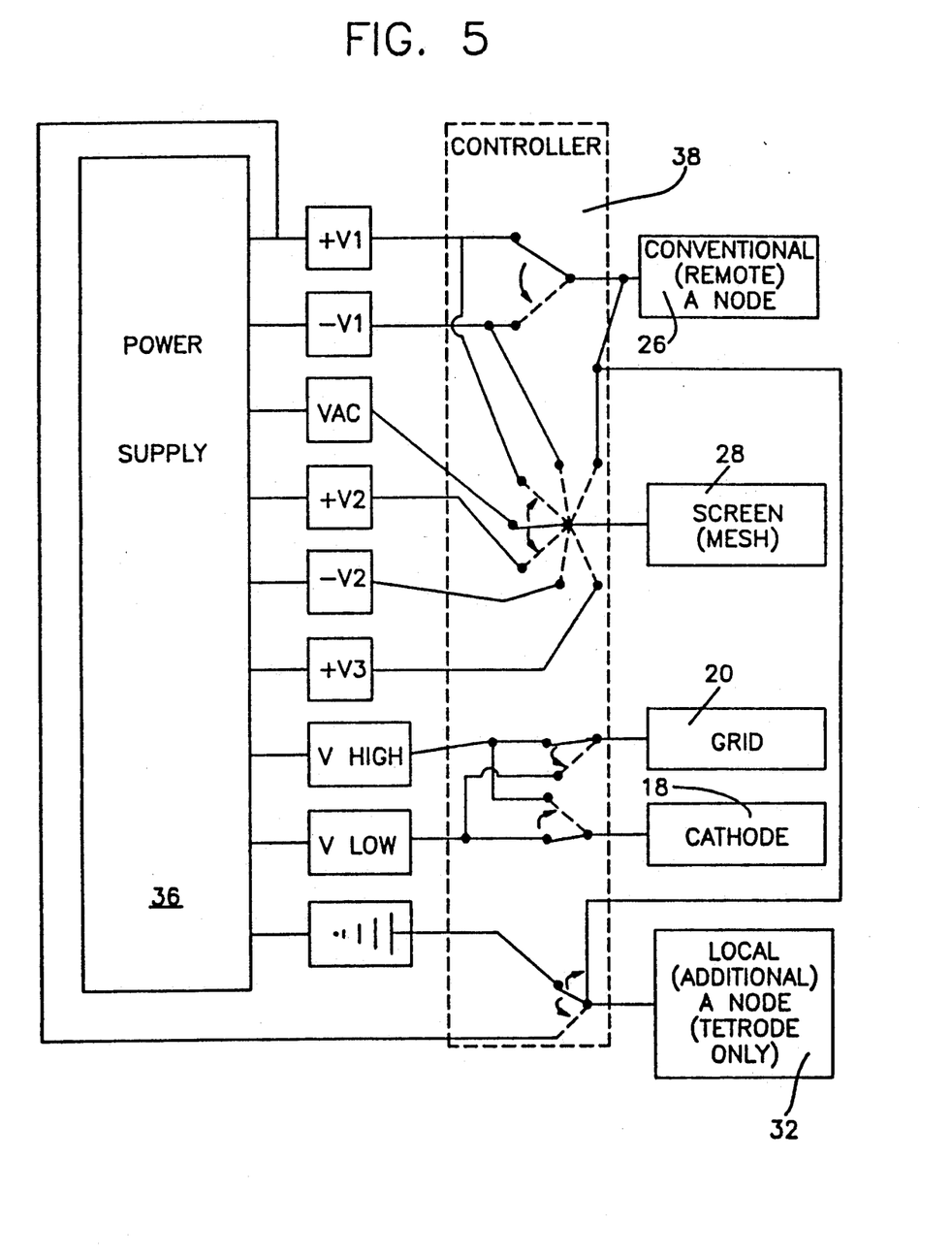
FIG. 5 is a schematic diagram showing the connection of the devices depicted in FIGS. 1 through 4 to a power supply as controlled by a controller.

FIG. 5 illustrates in schematic form how the various components of the electrophoretic displays described above in reference to FIGS. through 4 might be electrically connected to a suitable power supply 36 under the control of a digital controller 38 in order to assume the correct voltage states during the operations described.

Given the capacity of the present invention to execute erase, full write and selective pixel writing, i.e., WRITE IMAGE, it may be operated in a first or normal mode of foreground color image upon background color or in a second reverse video mode wherein image is written in background color upon foreground color. For example, if pigment color is designated foreground and dye/mesh color is designated background, then in normal mode characters (image) will be pigment colored at anode in a field of dye/mesh colored background. For reverse video mode at the anode, dye/mesh color characters (image) will remain unwritten against a field of written pigment pixels.

It should be understood that the embodiments described herein are merely exemplary and that a person skilled in the art may make many variations and modifications without departing from the spirit and scope of the invention as defined in the appended claims.

We claim:

1. An electrophoretic display, comprising:
   (a) a fluid-tight envelope having a portion thereof which is at least partially transparent;
   (b) an electrophoretic fluid contained within said envelope, said fluid having pigment particles suspended therein;
   (c) means for selectively positioning said particles within said envelope such that said particles form images which are visible to a viewer when viewed through said transparent portion, said means for selectively positioning including a cathode, a grid and an anode; and
   (d) a mesh composed of an electrically conductive material disposed within said envelope dividing an interior space in said envelope containing said fluid into a front portion proximate said transparent portion of said envelope and a back portion distal to said transparent portion, said mesh being at least partially opaque when viewed through said transparent portion of said envelope and obscuring said particles from being viewed through said transparent portion when said particles are in said back portion, said mesh allowing said particles to pass through under the control of said positioning means such that said particles can be viewed or obscured depending upon the position of said particles with respect to said mesh, said mesh being selectively electrically chargeable to induce movement of said particles within said fluid in cooperation with said position means.

2. The display of claim 1, wherein said pigment particles have a color which is differentiable from that of said fluid and from that of said mesh.

3. The display of claim 2, wherein the open area ratio for said mesh is approximately from 40% to 50%.

4. The display of claim 3, wherein said mesh is black in color.

5. The display of claim 4, wherein said fluid is at least partially transparent.

6. The display of claim 5, wherein said mesh is anodized.

7. The display of claim 6, wherein said pigment particles are yellow.

8. The display of claim 7, wherein said display has a first operating mode in which said pigment particles represent the foreground component of a displayed monochrome image and said mesh represents the background component of said displayed image and a second operating mode in which said pigment particles represent the background component of said displayed monochrome image and said mesh represents the foreground component of said displayed image.

9. The display of claim 8, wherein said display is a triode-type display having said anode disposed proximate said transparent portion and said cathode and said grid disposed in said back portion.

10. The display of claim 9, wherein said transparent portion of said envelope includes a portion through which said back portion can be viewed.

11. The display of claim 9, wherein said display is a tetrode-type display having a local anode overlying said grid said positioning means including said local anode.

12. The display of claim 11, wherein said transparent portion of said envelope includes a portion, through which said back portion can be viewed.

13. An electrophoretic display comprising:
   (a) a fluid-tight envelope having a portion thereof which is at least partially transparent;
   (b) an electrophoretic fluid contained within said envelope, said fluid having pigmented particles suspended therein;
   (c) a plurality of elongated substantially parallel horizontal conductor members disposed within a first plane and at least partially contained within said envelope;
   (d) a plurality of elongated substantially parallel vertical conductor members at least partially contained within said envelope electrically insulated from said horizontal members and disposed within a second plane, said first and said second planes being substantially parallel and in proximity to each other, said plurality of horizontal members and said plurality of vertical members forming a matrix with a plurality of intersections when viewed along a line perpendicular to said first and said second planes;
   (e) a substantially planar conductor member disposed within a third plane proximate and substantially parallel to said second plane and at least partially contained within said envelope; and
   (f) a perforated electrically conductive screen disposed between said vertical members and said planar member, said screen allowing said pigment particles to pass through the perforations thereof and being at least partially opaque when viewed through said transparent portion of said envelope, each of said vertical and said horizontal members in said matrix and said screen being selectively electrically chargeable to induce movement of said particles within said fluid, said particles being visible through said transparent portion of said envelope.

14. The display of claim 13, wherein said screen is substantially coextensive with said horizontal members and with said vertical members and has a color contrasting with that of said pigment particles.

15. The display of claim 14, wherein said screen is electrically insulated from said vertical and planar members.

16. The display of claim 15, wherein said fluid is substantially transparent.

17. The display of claim 16, wherein said envelope includes a first flat faceplate, a central portion of which is said transparent portion of said envelope, said first faceplate being a substrate for supporting said planar member.

18. The display of claim 17, wherein said envelope includes a second substantially flat faceplate and at least one spacer interposed between and sealably attached to said first and second faceplates to form said envelope, said first plurality of horizontal conductor members being positioned proximate said second faceplate.

19. The display of claim 18, wherein said at least one spacer includes two spacers, a first sealably affixed to said first faceplate and a second sealably affixed to said second faceplate, said first and second spacers sealably affixing to each other distal to said first and second faceplates and sandwiching said screen therebetween.

20. The display of claim 19, wherein the open area ratio for said screen is approximately from 40% to 50%.

21. The display of claim 20, wherein said second faceplate is a substrate for supporting said first plurality of horizontal conductor members.

22. The display of claim 21, wherein said display is a tetrode-type display, said plurality of horizontal members being the cathode, said plurality of vertical members being the grid and said planar member being the remote anode and further including a plurality of local anode elements deposited upon said grid elements in alignment therewith and insulated therefrom by interstitial insulator strips.

23. The display of claim 21, wherein said display is a triode-type display, said plurality of horizontal members being the grid and said planar member being the anode.

24. The display of claim 21, wherein said second faceplate is at least partially transparent and said electrophoretic fluid is visible therethrough, said display being in its entirety at least partially translucent in a direction perpendicular to said first and second faceplates.

25. The display of claim 24, wherein said screen reduces the translucence of said display.

26. The display of claim 25, wherein said screen is black in color.

27. The display of claim 26, wherein said screen is anodized.

28. The display of claim 27, wherein said pigment particles are yellow.

29. The display of claim 16, wherein said display has a first operating mode in which said pigment particles represent the foreground component of a displayed monochrome image and said screen represents the background component of said displayed image and a second operating mode in which said pigment particles represent the background component of said displayed monochrome image and said screen represents the foreground component of said displayed image.

30. The display of claim 16, wherein a dye of approximately the same color as said screen is added to said fluid.

31. In an electrophoretic display of the type having a cathode matrix comprising a plurality of parallel lines arranged in a given direction, with a grid matrix insulated from said cathode matrix and comprising a plurality of parallel lines each perpendicular to said cathode lines to form an X-Y addressing matrix with a conventional anode electrode separated from said X-Y matrix with the space between said anode electrode and said X-Y matrix accommodating an electrophoretic dispersion including pigment particles suspended a fluid, the improvement therewith of:

a mesh composed of an electrically conductive material disposed within said space between said anode electrode and said X-Y matrix, said mesh allowing said pigment particles to pass therethrough under the control of said anode and said X-Y matrix, said mesh being at least partially opaque and providing a contrasting background for said pigment particles and being selectively electrically chargeable to induce movement of said particles within said fluid in cooperation with said X-Y matrix and said anode.

32. The device of claim 31, wherein said mesh is perforated by a plurality of perforations through which said particles pass, said mesh when interposed between a viewer and said pigment particles at least partially obscuring said pigment particles from view.

33. The device of claim 32, wherein said pigment particles have a color which is differentiable from that of said fluid and from that of said mesh.

34. The device of claim 33, wherein the open area ratio for said mesh is approximately from 40% to 50%.

35. The device of claim 34, wherein said mesh is black in color.

36. The device of claim 35, wherein said fluid is at least partially transparent.

37. The device of claim 36, wherein said mesh is anodized.

38. The device of claim 37, wherein said pigment particles are yellow.

39. The device of claim 38, wherein said display has a first operating mode in which said pigment particles represent the foreground component of a displayed monochrome image and said screen represents the background component of said displayed image and a second operating mode in which said pigment particles represent the background component of said displayed monochrome image and said mesh represents the foreground component of said displayed image.

40. The device of claim 39, said display further includes an additional anode electrode comprising a plurality of parallel lines each associated with and insulated from a respective grid line with said additional anode operative to control the path of said pigment particles to and from said X-Y matrix and through said mesh and to allow excess pigment to remain at said conventional anode electrode.

41. A method for operating an electrophoretic display of the type having a cathode matrix comprising a plurality of parallel lines arranged in a given direction, with a grid matrix insulated from said cathode matrix and comprising a plurality of parallel lines each perpendicular to said cathode lines to form an X-Y addressing matrix with a conventional anode electrode separated from said X-Y matrix with the space between said anode electrode and said X-Y matrix accommodating an electrophoretic dispersion including pigment particles suspended in a fluid, and a screen composed of an electrically conductive material disposed within said space between said anode electrode and said X-Y matrix, said screen allowing said pigment particles to pass therethrough under the control of said anode and said X-Y matrix, said screen being at least partially opaque and providing a contrasting background for said pigment particles includes the steps of;

(a) electrically connecting said cathode matrix, said grid matrix, said screen and said conventional anode to a source of electrical potential energy, said source providing a range of independent and selectively variable voltages to each of said cathode matrix, said grid matrix, said screen and said anode under the control of control means for controlling the voltage level supplied by said source to each of said cathode matrix, said grid matrix, said screen and said anode; and (b) controlling said source of electrical potential energy with said control means such that voltage levels are applied to said cathode matrix, said grid matrix, said screen and said anode for performing display operations.

42. The method of claim 41, wherein said display further includes an additional anode electrode comprising a plurality of parallel lines each associated with and insulated from a respective grid line with said additional anode operative to control the path of said pigment particles to and from said X-Y matrix and through said screen and to allow excess pigment to remain at said conventional anode electrode and further comprising the step of electrically connecting said controlled source of electrical potential energy to said additional anode, voltage levels supplied to said additional anode being included in said step of controlling for performing display operations.

43. The method of claim 42, wherein said display operations includes placing said display in a POWER-OFF-IMAGE-HOLD mode wherein a written said image is held on said display after the removal of power from said display by disconnecting said source of electrical potential from said conventional anode, said additional anode, said cathode matrix, said grid matrix and said screen, in that order.

44. The method of claim 41, wherein said display operations include placing said display in a POWER-OFF-IMAGE-HOLD mode wherein a written said image is held on said display after the removal of power from said display by disconnecting said source of electrical potential from said anode, said cathode matrix, said grid matrix and said screen, in that order.

* * * * *